(12) United States Patent
Meier

(10) Patent No.: US 11,325,843 B2
(45) Date of Patent: May 10, 2022

(54) FIXTURE AND METHOD FOR PURIFYING A DRINKING WATER PURIFICATION SYSTEM

(71) Applicant: Grohe AG, Hemer (DE)

(72) Inventor: Torsten Meier, Neuss (DE)

(73) Assignee: Grohe AG, Hemer (DE)

( * ) Notice: Subject to any disclaimer, the term of this patent is extended or adjusted under 35 U.S.C. 154(b) by 182 days.

(21) Appl. No.: 16/420,957

(22) Filed: May 23, 2019

(65) Prior Publication Data

US 2019/0359499 A1    Nov. 28, 2019

(30) Foreign Application Priority Data

May 23, 2018    (DE) .................... 10 2018 112 362.0

(51) Int. Cl.
  *C02F 1/00*    (2006.01)
  *C02F 1/44*    (2006.01)
  *C02F 1/28*    (2006.01)

(52) U.S. Cl.
  CPC .............. *C02F 1/003* (2013.01); *C02F 1/444* (2013.01); *C02F 1/28* (2013.01); *C02F 1/441* (2013.01); *C02F 2307/06* (2013.01)

(58) Field of Classification Search
  None
  See application file for complete search history.

(56) References Cited

U.S. PATENT DOCUMENTS

| | | | | |
|---|---|---|---|---|
| 4,556,484 A * | 12/1985 | Hunter | ................. | B01D 35/043 137/798 |
| 4,761,295 A * | 8/1988 | Casey | ..................... | A21D 2/02 210/257.2 |
| 4,844,796 A * | 7/1989 | Plester | .................... | C02F 9/005 210/100 |
| 4,859,320 A * | 8/1989 | Beall, Jr. | ................ | B01D 61/08 210/136 |
| 5,017,284 A * | 5/1991 | Miler | ................... | B01D 61/025 210/97 |
| 5,069,782 A * | 12/1991 | Moyher, Jr. | ............ | C02F 1/325 210/192 |
| 5,110,418 A * | 5/1992 | Garrison | .................. | B01D 3/02 137/392 |
| 5,110,419 A * | 5/1992 | Weber | ..................... | B01D 3/02 165/110 |

(Continued)

FOREIGN PATENT DOCUMENTS

| | | |
|---|---|---|
| DE | 3617490 A1 | 11/1987 |
| DE | 3620551 A1 | 12/1987 |

(Continued)

*Primary Examiner* — Robert J Popovics
(74) *Attorney, Agent, or Firm* — Muncy, Geissler, Olds & Lowe, P.C.

(57) ABSTRACT

The invention relates to a fixture and a method for cleaning a drinking water purification system including the following steps: removal of a filter cartridge from a cartridge holder of a filtering unit in a cold water line, insertion of a connection adapter into the cartridge holder to form a fluid connection with the cold water line, connection of a connecting piece of a hot water line to the connection adapter, heating of water with a heater interconnected with the hot water line, delivery of heated water via the connecting piece of the hot water line and the connection adapter into the cold water line.

3 Claims, 3 Drawing Sheets

(56) References Cited

U.S. PATENT DOCUMENTS

| | | | | |
|---|---|---|---|---|
| 5,176,165 A * | 1/1993 | Traylor | E03C 1/104 | 137/216.1 |
| 5,188,710 A * | 2/1993 | Weber | B01D 3/02 | 202/185.3 |
| 5,196,093 A * | 3/1993 | Weber | B01D 3/02 | 134/93 |
| 5,200,039 A * | 4/1993 | Weber | B01D 3/42 | 122/489 |
| 5,254,243 A * | 10/1993 | Carr | B01D 61/12 | 210/110 |
| 5,256,279 A * | 10/1993 | Voznick | B01D 17/0214 | 210/86 |
| 5,266,170 A * | 11/1993 | Weber | B01D 3/02 | 202/185.3 |
| 5,443,739 A * | 8/1995 | Vogel | G07F 13/065 | 210/652 |
| 5,449,456 A * | 9/1995 | Bowman | B01D 61/08 | 137/216 |
| 5,635,058 A * | 6/1997 | Bowman | B01D 61/08 | 137/216 |
| 5,707,518 A * | 1/1998 | Coates | B01D 35/153 | 210/232 |
| 5,714,066 A * | 2/1998 | Jang | B01D 61/08 | 210/434 |
| 5,776,333 A * | 7/1998 | Plester | E03B 7/074 | 210/104 |
| 5,858,248 A * | 1/1999 | Plester | C02F 5/025 | 210/709 |
| 6,240,829 B1 * | 6/2001 | McGarrah | A23F 3/163 | 222/129.4 |
| 6,264,830 B1 * | 7/2001 | Plester | C02F 9/005 | 210/103 |
| 6,416,673 B2 * | 7/2002 | Plester | C02F 9/005 | 210/737 |
| 6,451,211 B1 * | 9/2002 | Plester | C02F 5/025 | 210/709 |
| 6,495,049 B1 * | 12/2002 | Van Esch | C02F 9/005 | 210/103 |
| 6,685,059 B2 * | 2/2004 | Jones | A47J 31/469 | 222/129.1 |
| 6,797,165 B2 * | 9/2004 | Harrison | B01D 35/157 | 210/232 |
| 6,821,414 B1 * | 11/2004 | Johnson | C02F 1/008 | 210/181 |
| 6,883,685 B2 * | 4/2005 | Jones | B67D 1/0037 | 222/146.5 |
| 6,968,860 B1 * | 11/2005 | Haenlein | E03C 1/05 | 137/599.03 |
| 6,988,641 B2 * | 1/2006 | Jones | A47J 31/469 | 222/129.1 |
| 7,837,866 B2 * | 11/2010 | Burrows | C02F 9/005 | 210/97 |
| 8,298,420 B2 * | 10/2012 | Burrows | B01D 61/025 | 210/232 |
| 8,359,877 B2 * | 1/2013 | Kamen | C02F 1/041 | 62/285 |
| 8,398,852 B2 * | 3/2013 | Burrows | B01D 61/04 | 210/232 |
| 8,511,105 B2 * | 8/2013 | Kamen | C02F 1/048 | 62/285 |
| 8,888,963 B2 * | 11/2014 | Kamen | B01D 1/2887 | 202/185.1 |
| 9,309,104 B2 * | 4/2016 | Kamen | B01D 1/28 | |
| 9,422,173 B1 * | 8/2016 | Spiegel | C02F 1/461 | |
| 9,650,767 B2 * | 5/2017 | Nightlinger | E03C 1/04 | |
| 9,739,040 B2 | 8/2017 | Gnauert et al. | | |
| 9,919,933 B2 * | 3/2018 | Burrows | B01D 61/025 | |
| 9,937,435 B2 * | 4/2018 | Kamen | B67D 1/124 | |
| 10,155,174 B2 * | 12/2018 | Kamen | B67D 1/0014 | |
| 10,183,870 B2 * | 1/2019 | Lautzenheiser | B01D 35/30 | |
| 10,183,874 B2 * | 1/2019 | Burrows | C02F 1/28 | |
| 10,196,292 B2 * | 2/2019 | Burrows | B01D 61/08 | |
| 10,279,315 B2 * | 5/2019 | Spiegel | C02F 1/441 | |
| 10,464,827 B2 * | 11/2019 | Burrows | C02F 1/28 | |
| 10,562,794 B2 * | 2/2020 | Burrows | B01D 61/10 | |
| 10,562,795 B2 * | 2/2020 | Burrows | B01D 61/10 | |
| 10,675,573 B2 * | 6/2020 | Miller | G05D 7/0635 | |
| 10,744,421 B2 * | 8/2020 | Kamen | B01D 5/0006 | |
| 10,787,381 B2 * | 9/2020 | Burrows | B01D 35/306 | |
| 10,846,975 B2 * | 11/2020 | Tansey, Jr. | G07F 13/04 | |
| 2002/0074350 A1 * | 6/2002 | Jones | A47J 31/469 | 222/146.5 |
| 2004/0056046 A1 * | 3/2004 | Jones | A47J 31/469 | 222/129.3 |
| 2008/0087587 A1 * | 4/2008 | Burrows | B01D 61/08 | 210/86 |
| 2009/0173683 A1 * | 7/2009 | Burrows | B01D 61/025 | 210/234 |
| 2010/0101929 A1 * | 4/2010 | Kamen | B67D 1/0862 | 202/185.3 |
| 2010/0270217 A1 * | 10/2010 | Burrows | C02F 9/005 | 210/85 |
| 2011/0147194 A1 * | 6/2011 | Kamen | C02F 1/041 | 202/185.1 |
| 2013/0048549 A1 * | 2/2013 | Burrows | B01D 61/025 | 210/232 |
| 2013/0206574 A1 * | 8/2013 | Kamen | B01D 5/009 | 202/176 |
| 2013/0220134 A1 * | 8/2013 | Giua | A47J 31/525 | 99/280 |
| 2014/0151309 A1 * | 6/2014 | Schreiner | B64D 11/02 | 210/748.11 |
| 2014/0197197 A1 * | 7/2014 | Kamen | C02F 1/325 | 222/52 |
| 2014/0202567 A1 * | 7/2014 | Komatsu | G05B 9/03 | 137/565.29 |
| 2014/0203041 A1 * | 7/2014 | Komatsu | E03C 1/025 | 222/63 |
| 2014/0291411 A1 * | 10/2014 | Tamaki | F24D 17/001 | 237/2 B |
| 2015/0034730 A1 * | 2/2015 | Minamisako | F24D 19/1024 | 237/2 B |
| 2015/0075199 A1 * | 3/2015 | Kotani | F25B 7/00 | 62/238.7 |
| 2015/0075964 A1 * | 3/2015 | Kamen | C02F 1/18 | 202/180 |
| 2015/0226453 A1 * | 8/2015 | Nomoto | F24D 19/0092 | 62/238.7 |
| 2015/0354832 A1 * | 12/2015 | Sato | F24H 1/145 | 122/14.3 |
| 2016/0280575 A1 * | 9/2016 | Burrows | C02F 1/725 | |
| 2017/0370324 A1 * | 12/2017 | Shibata | F02G 5/00 | |
| 2019/0112213 A1 * | 4/2019 | Burrows | B01D 24/40 | |
| 2019/0359499 A1 * | 11/2019 | Meier | C02F 1/003 | |
| 2020/0376408 A1 * | 12/2020 | Kamen | B01D 5/0006 | |
| 2020/0400319 A1 * | 12/2020 | Yoshida | F24H 4/04 | |

FOREIGN PATENT DOCUMENTS

| | | | |
|---|---|---|---|
| DE | 102013000773 A1 | 7/2014 | |
| DE | 102013002236 A1 | 8/2014 | |
| DE | 102017203112 A1 | 8/2018 | |
| EP | 1025917 A1 | 8/2000 | |

* cited by examiner

FIXTURE AND METHOD FOR PURIFYING A DRINKING WATER PURIFICATION SYSTEM

This nonprovisional application claims priority under 35 U.S.C. § 119(a) to German Patent Application No. 102018112362.0, which was filed in Germany on May 23, 2018, and which is herein incorporated by reference.

BACKGROUND OF THE INVENTION

Field of the Invention

The present invention relates to a drinking water purification system, for example for a domestic household. In particular, the invention relates to a faucet by means of which drinking water can be provided.

Description of the Background Art

Faucets are known which are used to adjust the temperature and/or amount of mixed water from a mixer tap, in particular a single-lever mixer tap, wherein the temperature and/or the amount of the mixed water can be adjusted by the control lever. To this end, the mixer tap is connected to a cold water line which is connected to the water supply network, and to a hot water line. On the outlet side, the mixer tap is connected via a mixed water line to the water outlet of the faucet.

To further increase the functionality, it has been proposed to associate such faucets with a cooling unit, a carbonator and/or a filtering unit. These units can be in fluid connection with the faucet via a separate supply line. So that the water pretreated by the unit by filtering, carbonization and/or cooling can be tapped, a further control element can be provided on the faucet.

The treatment of the water so that it can be used as drinking water can be realized in a subbranch of the cold water line. For this purpose, it may be provided that on an as needed basis, the cold water is first fed to a filtering unit and then to a cooling unit and/or a carbonator. On this basis, the pretreated water is guided to the faucet, wherein here, too, a separate cold water line can be provided up to the mouth of the faucet.

By operating the further control element, the control element for the targeted delivery of mixed water (with respect to temperature and/or quantity) can alternatively be used to predetermine the amount of drinking water which is discharged through the faucet. For this purpose, a further control element can be provided which ensures this alternative control of the first control element. This second control element may also serve to adjust the degree to which the drinking water is pretreated, for example, in respect of temperature and/or carbon dioxide content.

The second control element can thus be configured to set the targeted addition of $CO_2$ contained in the carbonator to the filtered water, so that drinking water can be delivered with a low, medium or high carbon dioxide content.

The fact that drinking water is provided through the faucet places high demands of cleanliness and/or purity on the drinking water line or the equipment coming into contact with the drinking water. A key issue here is the potential contamination of the water lines.

SUMMARY OF THE INVENTION

It is therefore an object of the present invention to disinfect the drinking water lines in a water purification system. The disinfection process should be quick and easy to perform.

In an exemplary embodiment, a drinking water purification system fixture is provided with which disinfection of drinking water lines can be performed without great additional expenditure on equipment. In this case, this process is to be carried out as safely as possible, that is, without increased risk of leakage, and as quickly as is feasible.

In an exemplary embodiment, a drinking water purification system comprises a water supply terminal, a cold water line, a hot water line with connecting piece, a heater associated with the hot water line, a filtering unit comprising at least one filter cartridge and one filter cartridge holder, which is associated with the cold water line, and a connection adapter configured for fluidically connecting the connecting piece and the hot water line to the cartridge holder.

The fixture may be designed in the manner of an under-counter appliance, wherein starting from the cold water line a branch is formed towards the fixture, which may be provided, for example, under a sink in a domestic household. Even if the drinking water purification system described here is primarily intended for domestic use, the invention is not limited thereto.

The cold water line or the hot water line can be connected to a water supply terminal, which is, for example, connected to the local water supply network. The water taken from the water supply terminal can be guided untreated via an optionally present mixer tap to the faucet and/or be brought to a certain temperature in a branched hot water line. The hot water line has at least one connecting piece with which the hot water line can form a branch and/or an interrupt. For example, it is possible to have a junction in the hot water line, which is releasable, so that an optionally movable connecting piece is provided in the hot water line. It is alternatively or additionally possible that the hot water line comprises a valve from which an (optional, movable) connecting piece branches off. On or in the hot water line, a heater can be provided. The latter is particularly configured such that it can heat the water flowing through the hot water line to a predetermined temperature, for example at least 80° C. The heater can be provided upstream of the connecting piece so that heated water can be delivered via the connecting piece.

Further, at least one filtering unit is provided. The filtering unit may be mounted under the sink, wherein the cartridge holder may be attached to a cabinet or a wall. In or on the cartridge holder, at least one filter cartridge can be provided. The filter cartridge contains the filter medium used to purify the water. Since with increasing use and over time, such a filter cartridge regularly loses its effectiveness, it should be replaceable or upgradeable. The filter cartridge is used, for example, to reduce carbon hardness and can filter heavy metals such as lead and copper from the water that is provided via the water supply terminal. In addition to reducing turbidity and organic impurities, substances that disturb smell and flavor (for example chlorine) are also reduced. Furthermore, the filter material retains particles such as sand or suspended matter. The filtering unit serves to filter the water coming from the cold water line.

In addition, a connection adapter can be configured for the fluid connection of the connecting piece of the hot water line to the cartridge holder. This means in particular that the connection adapter is (tightly but releasably) connectable to the cartridge holder. This also means that the connection adapter has a connection portion with which the connecting piece of the hot water is (tightly and releasably) connected. The connection adapter may be configured to interact there with the cartridge holder, i.e. to interact in the same way as with the filter cartridge. For example, there may be a corresponding connection thread which is suitable for the filter cartridge and the connection adapter. Therefore, the connection adapter can be mounted in or on the cartridge holder as a substitute for the filter cartridge. Further, the connection adapter has a connecting portion with which the connecting piece of the hot water line can be connected. In the mounted state it is thus possible to allow hot water to flow through the connecting piece of the hot water line to the connection adapter and/or to the cartridge holder, and/or allow the part flowing therefrom to flow to the cold water line. This in particular opens up the possibility of feeding heated water for purposes of disinfection through the connection adapter or the cartridge holder to the areas of the cold water line into which the filtered drinking water is usually guided, or to flush said areas. Thus, the entire area of the cold water line, starting from the filtering unit up to the delivery point of the faucet, can be flushed or disinfected.

Starting from the filtering unit, the cold water line may have at least one cooling unit or carbonator stream. In other words, this means that the water flowing from the filtering unit or the connection adapter can flow through a cooling unit and/or a carbonator. The cooling unit may be an active and/or passive heat exchanger. A carbonator is, for example, a fixture by means of which carbon dioxide may be added to the water.

The connecting piece can be formed downstream of the heater. In this way it is possible to trigger the heater already provided in the hot water line for outputting a sufficient amount of warm water, with which the desired part of the cold water line can be disinfected or flushed. This way, external or additional heater can be avoided.

According to a further aspect, a method for cleaning a drinking water purification system is proposed which comprises: removal of a filter cartridge from a cartridge holder of a filtering unit in a cold water line, Insertion of a connection adapter in the cartridge holder to form a fluid connection with the cold water line, connection of a connecting piece of a hot water line to the connection adapter, heating of water using a heater interconnected with the hot water line, and delivery of heated water through the connecting piece of the hot water line and the connection adapter into the cold water line.

The sequence of steps listed here corresponds to the usual, preferred sequence, which, however, does not need to be strictly followed. In particular, the steps may sometimes be temporally superimposed, repeated at varying times, and the like.

A replacement of the filter cartridge by the connection adapter can be performed. The connecting piece of the hot water line can be mounted tightly on the connection adapter. Thus, a direct connection is realized between the hot water line and the cold water line via the connection adapter. Heated water, for example with a temperature above 60° C. or at approx. 80° C., is then flushed through the connecting piece and connection adapter into the cold water line, up to the output of the faucet.

It is preferred that water with a temperature of at least 60° C. is delivered to the cold water line, wherein the temperature does not fall below this threshold until it leaves the faucet.

The description regarding the fixture of the drinking water purification system equally describes the method set forth herein for cleaning a drinking water purification system and vice versa.

According to another aspect, a drinking water purification system with a control unit is proposed, wherein the control unit comprises a computer program product that contains commands which initiate a stored flushing routine. The control unit can be activated automatically or manually, for example. The computer program product may comprise guidelines and control routines with which the steps are executed, for example, in terms of water temperature and/or flushing duration and/or flushing intensity. If necessary, the computer program product and/or the method can also be used to check the system for leaks.

According to a further aspect, a connection adapter for the cartridge holder of a filtering unit of a drinking water purification system is proposed, laterally at least comprising a water inlet and laterally a water outlet and a channel therebetween, a type of seal at least near the water inlet and near the water outlet, an axial connection channel which opens into the channel, and a connecting portion surrounding the connection channel for fixing the hot water line.

The above explanations for the fixture or the method can accordingly be used for the characterization of the connection adapter. In particular the side or lateral connections for the water inlet and water outlet are formed diametrically opposed. The portion of the cold water line which extends towards the water supply terminal may be attached to the water inlet. The portion of the cold water line which extends toward the cooling unit and/or the carbonator and/or the faucet can be connected starting from the water outlet. At or around the water inlet and the water outlet, a seal may be provided so that a water tight connection is created towards the cold water line. Between the water inlet and the water outlet, a channel is provided. It is possible that the channel extends continuously from the water outlet to the seal, but it is also possible that this channel extends only over the axial connection channel or over a plurality of axial connection channels towards the water outlet. It is particularly preferred that, starting from the water inlet, a first channel extends to a first axial connection channel, which can lead to the hot water line and a second connection channel, which extends from the hot water line to a second channel and further to the water outlet. Thus, it may be possible that water from the hot water line flows (separately) towards the water inlet and towards the water outlet. This way, the cold water line can be flushed on either side at the filtering unit. The connecting portion for fixing a hot water line can be formed with a thread, a snap connection, a latching tab or the like. A seal may additionally be provided. Via the connecting portion, in particular a tight, releasable fixing of the hot water line to the connector adapter is possible.

Preferably, the connection adapter described here is used to disinfect a cold water line of a drinking water purification system using heated water. Furthermore, it is proposed to use a fixture of the type described here to disinfect a cold water line of a drinking water purification system using heated water.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
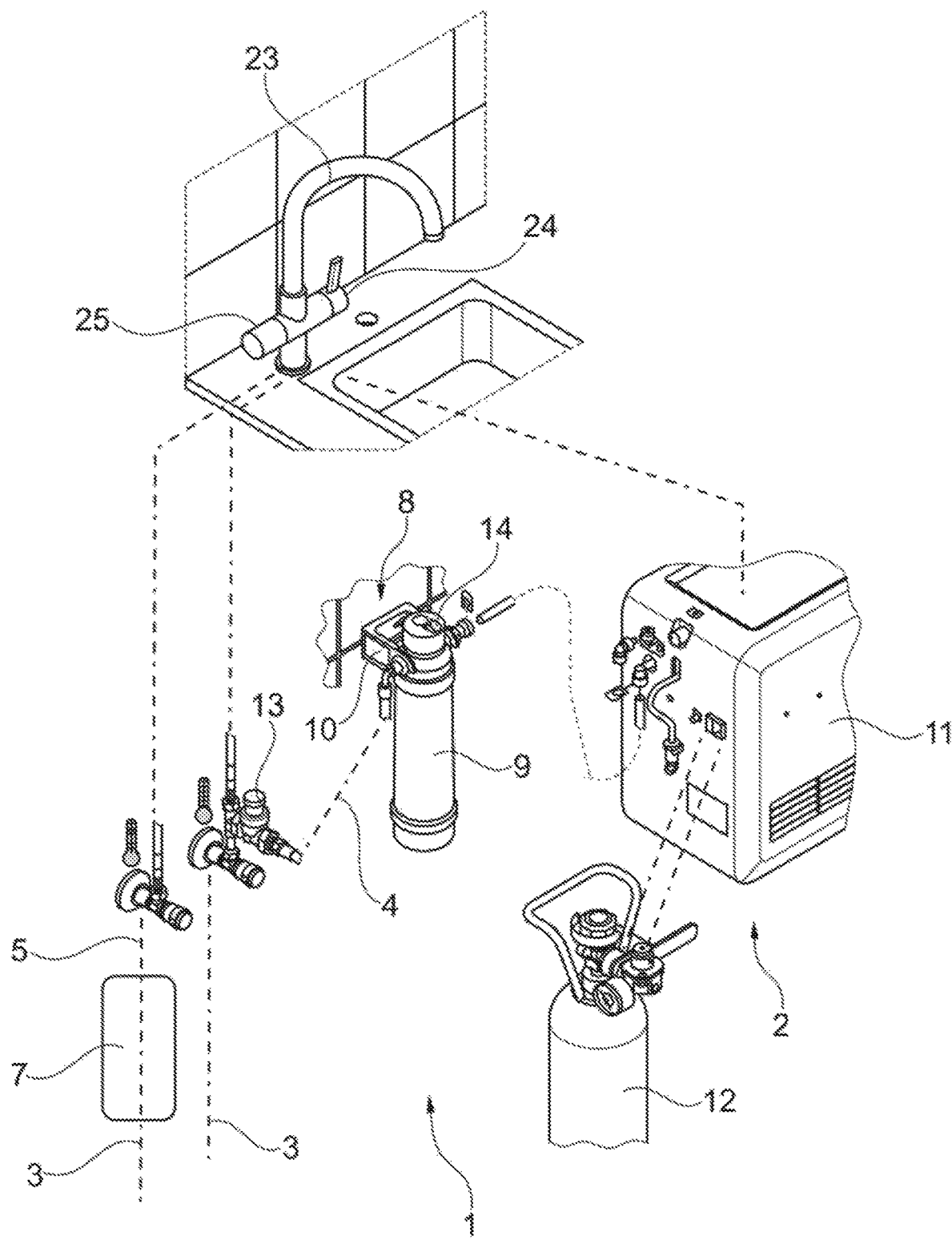
FIG. 1 illustrates a drinking water purification system during normal use.

FIG. 1 schematically shows a fixture 1 of a drinking water purification system 2, as it can be used in a domestic household. In the left section of FIG. 1, it is indicated that there is a cold water line 4 and a hot water line 5, which extend from a water supply terminal 3. Through this cold water line 4 and hot water line 5, in which a heater 7 is provided, a faucet 23 is fed mixed water. For the delivery of this mixed water, the faucet 23 has a mixing valve (not shown), and water having a desired temperature and flow can be discharged via a first control element 24.

Further provided in the cold water line 4 is a valve 13 from which the cold water line 4 branches off. The water flowing from the water supply terminal 3 through the valve 13 to the right is then guided to a filtering unit 8. The filtering unit 8 comprises a cartridge holder 10 which is mounted, for example, on a wall below the sink. A filter cartridge 9 is releasably fixed in the cartridge holder 10. The connection adapter 14 illustrated here in particular defines the flow path of the cold water line 4 in such a way that the inflowing cold water flows from the cold water line 4 into the filter cartridge, is filtered there and the filtered water is again discharged.

After exiting the filtering unit 8, the filtered water continues to flow towards a cooling unit 11, with which a desired low temperature of the filtered water is adjustable. In particular after cooling the filtered water, the water may be fed to a carbonator 12 in which carbon dioxide is added to the water. Thus, the present drinking water purification system 2 includes in this case, for example, filtration, cooling and carbon dioxide generation. The thus treated drinking water then also reaches the faucet 23. If the drinking water is to be discharged, a second control element 25 may be provided on the faucet 23 with which drinking water of the desired temperature and/or the desired degree of carbonation can be discharged via the faucet 23, optionally in joint interconnection with the first control element 24.

Figure 2:
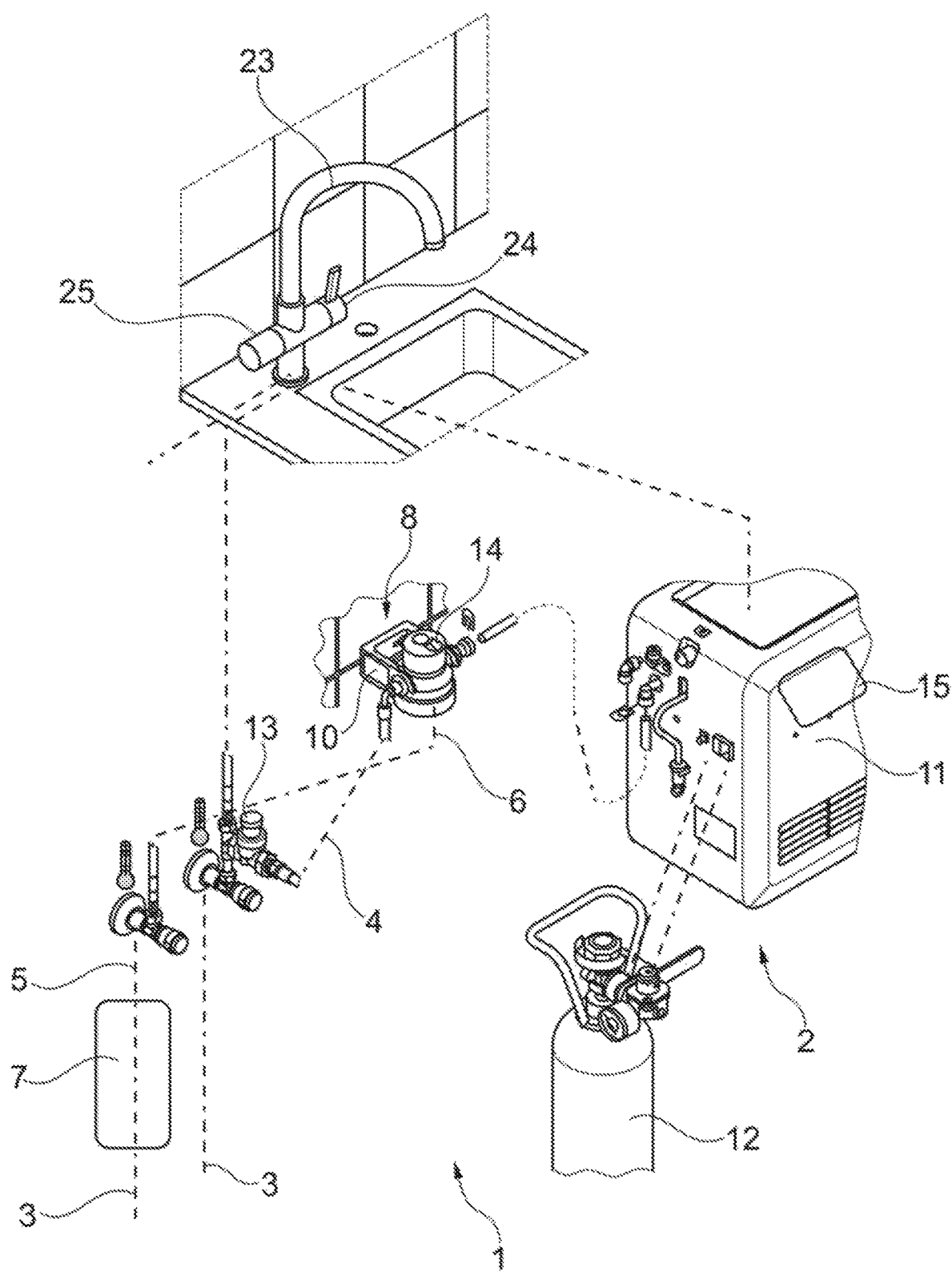
FIG. 2 illustrates a drinking water purification system during the disinfection process.

FIG. 2 shows the installation in which the disinfection of the drinking water purification system 2 is carried out. Only for this purpose, the filter cartridge 9 was removed and a fluid connection with a hot water line 5 was established via the same or an alternatively used connection adapter 24. For this purpose, a connecting piece 6 of the hot water line 5 was releasably secured in a water-tight manner with the connection adapter 14 configured for this purpose. After an appropriate installation, for example, a control unit 15 can be activated via the drinking water purification system 2, which then initiates a concrete rinsing routine, wherein this control unit 15 can then, for example, access a pump of the drinking water purification system and/or can regulate the heater 7.

In addition to the illustration shown here, according to which the hot water line 5 is separated to form a connecting piece 6 which can be connected to the connection adapter 14, it is of course also possible to provide a valve at the appropriate place, and to then branch off from the hot water line 5, as is shown here similarly for the cold water line.

Figure 3:
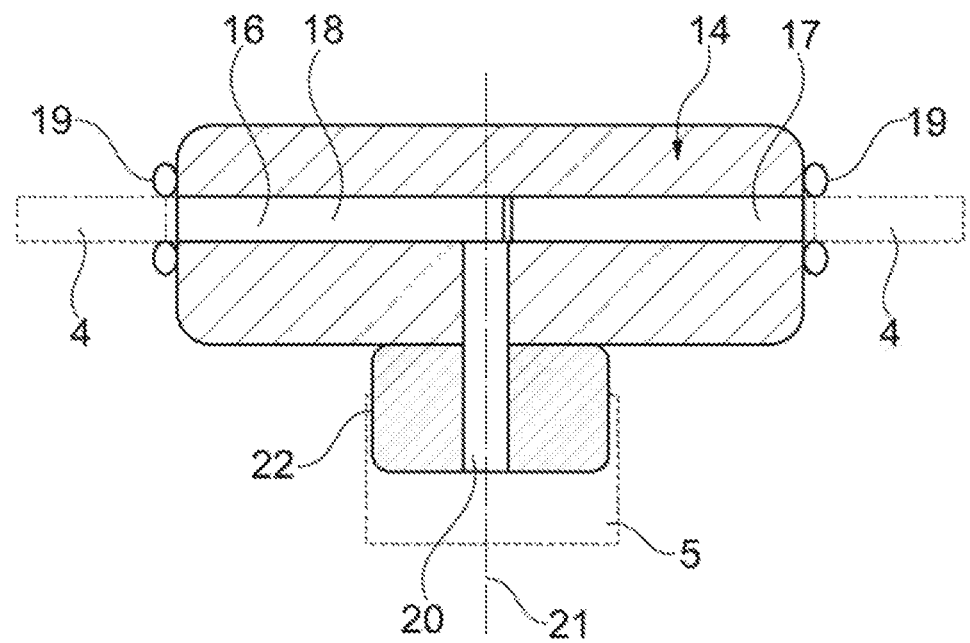
FIG. 3 illustrates a connection adapter.

FIG. 3 schematically illustrates a connection adapter 14, which can be inserted in a cartridge holder. Untreated water can enter through the connection adapter via the cold water line section shown on the left and the water inlet 16, wherein the connection between the cold water line 4 and the water inlet is provided with a seal. From there the water passes into a channel 18 of the connection adapter and is then guided down into the axial connection channel 20. In this area, the connection adapter 14 is designed with an external connection portion at which the hot water line 5 is arranged. Thus, the water can flow, for example, along the axis 21 into the channel 18. It is possible that a plurality of axial connection channels is provided. In this case, a connection channel 20 can also be fluidically connected to the water outlet 17 so that water entering through the hot water line 5 can inflow towards the water outlet 17 and then proceed into the subsequent sections of the cold water line 4.

In this embodiment of the connection adapter 14, the connection adapter 14 can releasably connect both the filter cartridge and the hot water line in a water-tight manner.

Figure 4:
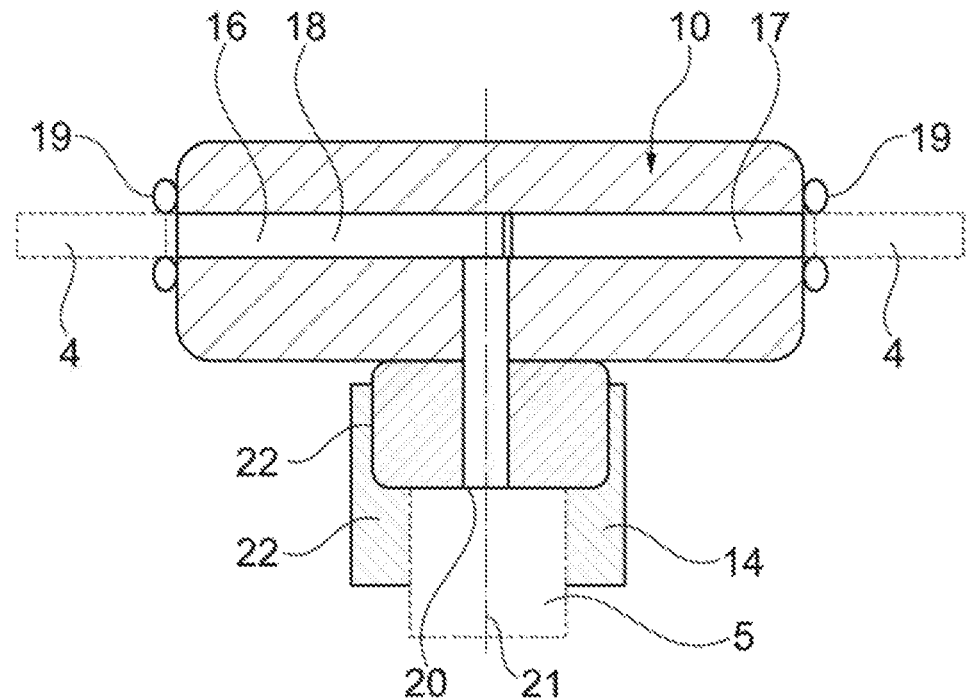
FIG. 4 illustrates a connection adapter.

FIG. 4 shows a slightly different embodiment, wherein now the upper portion is still formed as part of the cartridge holder 10, on which usually the filter cartridge is mounted. Positioned on this (first) connection portion is now the connection adapter 14, which (solely) creates a further connection portion 22 and which realizes the (tight and releasable) connection of the hot water line 5 towards the axial connection channel 20.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A fixture for a drinking water purification system, the fixture comprising:
   a water supply line;
   a cold water line in fluid communication with the water supply line;
   a hot water line in fluid communication with the water supply line;
   a connecting piece;
   a heater on or in the hot water line;
   a filter cartridge;
   a filter cartridge holder having a port in fluid communication with the cold water line; and
   a connection adapter for placing the hot water line in fluid communication with the cold water line,
   the fixture being selectively operable between two modes:
      a filtration mode wherein the filter cartridge is installed in the filter cartridge holder such that a flow path of the cold water line is defined such that the inflowing cold water flows from the cold water line into the filter cartridge and is filtered; and
      a disinfection mode wherein the connection adapter is installed in the filter cartridge holder instead of the filter cartridge, and a connecting portion of the connection adapter is connected to the connecting piece which places the hot water line in fluid communication with the cold water line, thus permitting the feeding of heated water for purposes of disinfection through the connection adapter and the cartridge holder to areas of the cold water line into which the filtered drinking water is usually guided, to flush and/or disinfect the areas.

2. The fixture assembly according to claim 1, wherein the cold water line has at least one cooling unit or a carbonator downstream of the filtering unit.

3. The fixture assembly according to claim 1, wherein the connecting piece is formed downstream of the heater.

\* \* \* \* \*